UNITED STATES PATENT OFFICE.

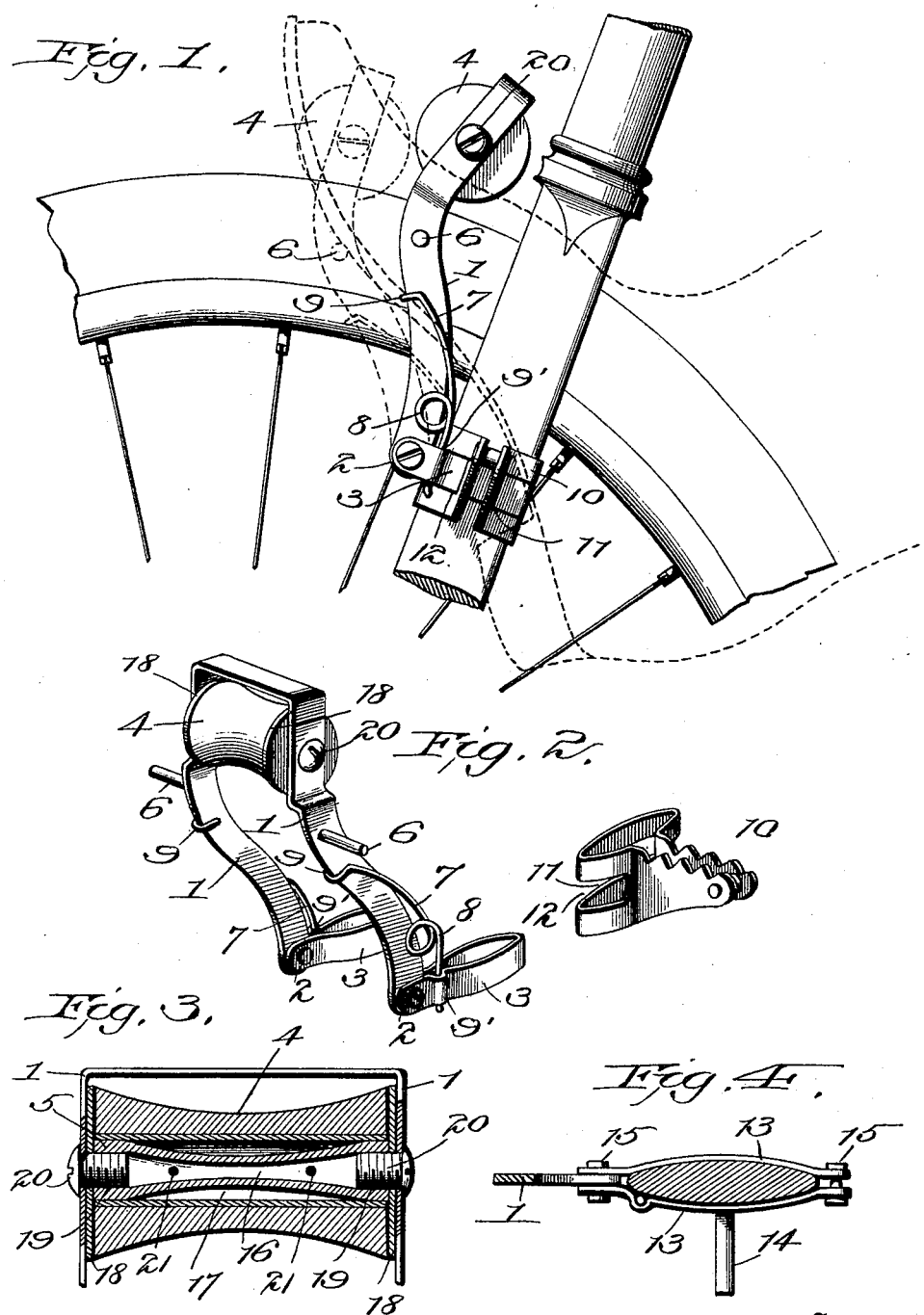

LLEWELLYN H. FLORY, OF ASHLEY, PENNSYLVANIA.

BICYCLE-BRAKE.

SPECIFICATION forming part of Letters Patent No. 583,253, dated May 25, 1897.

Application filed September 18, 1896. Serial No. 606,268. (No model.)

*To all whom it may concern:*

Be it known that I, LLEWELLYN H. FLORY, a citizen of the United States, residing at Ashley borough, in the county of Luzerne and State of Pennsylvania, have invented certain new and useful Improvements in Bicycle-Brakes; and I do hereby declare the following to be a full, clear, and exact description of the invention, such as will enable others skilled in the art to which it appertains to make and use the same.

My invention relates to brakes for bicycles, and particularly to the class of brakes adapted to be operated by the foot of the rider.

It has for its object to provide a brake which can be readily attached to any of the different forms of bicycles on the market without the services of a skilled workman and which will be simple and efficient in construction and operation and comparatively inexpensive to manufacture.

It has further for its object to provide a brake which can be operated by the rider when his feet are resting on the coasters, and also to improve the construction of the friction-roller and the other parts of the brake, so that the same may be rendered more efficient in operation than heretofore.

To the accomplishment of the foregoing and such other objects as may hereinafter appear, the invention consists in the construction and the combination of parts hereinafter particularly described and then sought to be specifically defined by the claims, reference being had to the accompanying drawings, forming a part hereof, and in which—

Figure 1 is a side view of a portion of a bicycle having my brake applied thereto and showing in dotted lines the position of the rider's foot when resting on the coasters and operating the brake. Fig. 2 is a perspective of the brake detached from a bicycle. Fig. 3 is a vertical section through the friction-roller, showing the lubricating-journal thereof; and Fig. 4 is a detail view of a modified form of support for the brake having the coaster formed thereon.

In the drawings the numerals 1 designate two oppositely-located foot-levers, which are pivoted at their inner ends at 2 to supporting-bands 3, located upon the opposite forks of the front wheel of the bicycle. These foot-levers extend forwardly from the forks and have pivoted in their outer ends a friction-roller 4, formed of wood, rubber, or other material, by means of a spindle 5, extending from one foot-lever to the other. Each of the levers is provided near its outer end with a foot-rest 6, extending at an angle therefrom, and is normally held out of contact with the tire by means of supporting-springs 7, which may be of any desired shape, but are shown as provided with a coiled portion 8 and a hooked side extension 9, adapted to lie under and support each of the foot-levers. The inner ends of the springs are seated in sockets 9', formed in the securing-bands 3, so that the levers are constantly supported by the springs, and when the roller is forced into contact with the tire the springs are placed under compression, whereby the roller and levers are at once returned to their normal position when the pressure is released. In connection with the form of clamp shown in Fig. 1 I employ coaster-clamps, located upon the opposite front forks, as at 10. These coasters have a portion of the band 11, which encircles the forks, cut away, so as to leave a space 12, into which the bands 3 are placed and secured by the coaster-clamps. In this way the brake-supporting bands are positively secured against slipping and a very simple and convenient attachment formed, which can be placed in a few moments upon any of the ordinary bicycles now in use.

Instead of using the arrangement of coasters and bands just described I can, however, use a clamp, such as is shown in Fig. 4, composed of two plates 13, adapted to be placed on opposite sides of each fork and the outer one of which has a coaster foot-support 14 extending therefrom. The plates 13 are secured together by nuts and bolts 15, or otherwise, and the foot-levers pivoted upon the forward securing-bolt, so as to swing in an arc in front of the head of the bicycle. The relation of the coasters and the foot-rests upon the foot-levers is such that when the shank of the foot rests upon the coasters the ball or forward portion thereof will be in contact with the foot-rest on the levers, whereby the brake can be immediately applied when desired by simply swinging downward the forward portion of the foot. It will thus be seen that the brake can be applied without removing the feet from their previous position when coasting and that the coasters are always free to be used without applying the brake. This feature is due to the location of the foot-rests on the levers in a position forward of and above the coaster-supports.

The spindle 5, on which the friction-roller 4 is journaled, is formed hollow throughout, so as to form a chamber 16 for lubricant, and tapers toward the central portion, thereby forming a lubricant-chamber 17 between the outer surface of the spindle and the inner surface of the friction-roller. This tapering of the spindle also causes the lubricant to work toward the center of the chamber 17 and away from the opposite ends of the spindle. At the ends of the spindle and between the friction-roller and the foot-levers I locate felt or leather washers 18 to form an oil-tight joint at the end of the roller-bearing and to prevent any jar or rattling of the roller which otherwise would occur in the movement of the bicycle. The spindle is provided at opposite ends with internal screw-threads 19, and screws 20 are passed through apertures in the foot-levers to engage the said screw-threads and firmly hold the journaling-spindle in place. Apertures 21 are formed in the spindle, so that the chamber 16 within the spindle may be in communication with the outer chamber 17. The two chambers are filled with a stiff lubricant, such as grease or any other suitable material, and as in the rotation of the friction-roller the lubricant becomes worn out of the chamber 17 the lubricant within the hollow spindle will be liquefied by the heat generated and pass through the apertures 21 into the outer chamber 17, so as to fill the same. The spindle can be readily refilled with lubricant whenever desired by simply removing one of the screws 20 and inserting the lubricant through the open end of the spindle. By this construction of friction-roller a brake is formed which is practically antirattling and the roller of which is kept constantly lubricated, so that the same will always rotate when in contact with the tire and not scrape over the same, as is now the case when the heat caused by rapid rotation causes the bearing of the roller to expand and lock the same against rotation. A thorough lubrication of the roller-bearing prevents this heating and the consequent difficulties resulting from the expansion and contraction of the metal parts.

In the operation of the brake when the roller is pressed forward, as shown in dotted lines in Fig. 1, the tire is compressed, forming a cushion of air behind the roller. By this compression of the tire the axis of the roller is brought nearly in line with the tangent to the outer rim of the tire at this point, and, as will be seen by reference to the figure, the pressure of the brake is oblique to the tangent instead of perpendicular to it, as in the case of the spoon-brake. Consequently a larger component of the force applied acts tangentially to the rim of the wheel, and the effective braking action is thus secured.

When it is desired to regulate or adjust the friction of the roller, the same may be accomplished by adjusting the screws 20, which will cause the foot-levers to press more or less against the ends of the roller and produce friction when it is desired or necessary.

I have described with particularity the details of construction of my brake, but it is obvious that the details of the several parts may be changed without departing from the essential features of the invention.

Having described this invention and set forth its merits, what is claimed is—

1. A bicycle-brake consisting of oppositely-located foot-levers pivoted to the front fork of the bicycle and extending forwardly therefrom, a friction-roller journaled between said levers at their forward ends, a hollow bearing-spindle provided with an aperture through its wall and having a portion thereof of less diameter than the interior bearing-surface of the roller to form a chamber for lubricant, and a spring to support said roller normally out of contact with the tire of a bicycle, substantially as described.

2. In a bicycle-brake, the combination with the oppositely-located foot-levers pivoted to the front fork of a bicycle, of a friction-roller journaled between said levers, a hollow bearing-spindle having apertures communicating with the interior thereof and interiorly screw-threaded at its ends, and retaining-screws passing through the levers and engaging the screw-threads in the ends of the spindle, substantially as described.

3. In a bicycle-brake, the combination with coaster-supports having an opening in the portion thereof encircling the front fork of a bicycle, of a supporting-band for the brake-levers lying within said opening in the coaster-supports, and foot-levers pivoted to said lever-supports and carrying a brake, substantially as described.

4. In a bicycle-brake, the combination with the oppositely-located foot-levers pivoted to the front fork of a bicycle, of a friction-roller journaled between said levers, and a hollow bearing-spindle for said roller tapering toward its center and having apertures therein to connect the chamber within the spindle with the chamber formed between the spindle and roller, substantially as described.

5. In a bicycle-brake, the combination with the oppositely-located foot-levers extending forwardly of the front forks of a bicycle, of supports for said levers secured to said forks, supporting-springs for said levers seated at one end in sockets in said supports and at their opposite ends connected to said foot-levers, a friction-roller at the outer end of said levers, a hollow spindle for said roller tapering toward the center from each end and provided with apertures connecting the chamber within the spindle with the space between the same and the friction-roller, and foot-rests extending from said levers, substantially as described.

In testimony whereof I affix my signature in presence of two witnesses.

LLEWELLYN H. FLORY.

Witnesses:
E. D. NICHOLS,
MARY E. JONES.